(12) United States Patent
Chey

(10) Patent No.: US 11,745,408 B2
(45) Date of Patent: Sep. 5, 2023

(54) MATERIAL FORMING APPARATUS USING DIAPHRAGM AND MATERIAL FORMING METHOD USING DIAPHRAGM

(71) Applicant: Suk Young Chey, Seoul (KR)

(72) Inventor: Suk Young Chey, Seoul (KR)

(73) Assignee: Suk Young Chey, Seoul (KR)

( * ) Notice: Subject to any disclaimer, the term of this patent is extended or adjusted under 35 U.S.C. 154(b) by 0 days.

(21) Appl. No.: 17/619,343

(22) PCT Filed: Sep. 10, 2020

(86) PCT No.: PCT/KR2020/012251
§ 371 (c)(1),
(2) Date: Dec. 15, 2021

(87) PCT Pub. No.: WO2021/157807
PCT Pub. Date: Aug. 12, 2021

(65) Prior Publication Data
US 2022/0203598 A1  Jun. 30, 2022

(30) Foreign Application Priority Data
Feb. 4, 2020  (KR) ........................ 10-2020-0013027

(51) Int. Cl.
*B29C 51/28* (2006.01)
*B29C 51/00* (2006.01)
(Continued)

(52) U.S. Cl.
CPC ............ *B29C 51/28* (2013.01); *B29C 51/008* (2013.01); *B29C 51/262* (2013.01); *B29C 51/421* (2013.01)

(58) Field of Classification Search
CPC ..... B29C 51/28; B29C 51/262; B29C 51/421; B29C 2043/3649; B29C 43/3642;
(Continued)

(56) References Cited

U.S. PATENT DOCUMENTS 4,689,474 A * 8/1987 Overbergh ........... B29C 61/0641
219/505
2012/0256348 A1* 10/2012 Bergmann ............ B29C 51/085
264/316
2012/0261853 A1* 10/2012 Piedmont ................ B29C 51/16
383/42

FOREIGN PATENT DOCUMENTS

JP      05-293895 A    11/1993
JP      H11-138624 A    5/1999
(Continued)

*Primary Examiner* — Francisco W Tschen
*Assistant Examiner* — Elisa H Vera
(74) *Attorney, Agent, or Firm* — Bridgeway IP Law Group, PLLC; Jihun Kim

(57) ABSTRACT

A material forming apparatus comprises: a support which is positioned at a side of a forming tool with respect to a material arranged on the forming tool to have a first part covered by the forming tool and a second part separated from the forming tool, and which supports the forming tool; a diaphragm which presses the second part of the material while the outer surface of the expanded diaphragm comes in close contact therewith, in a state in which the first part of the material is compressed by the forming tool and the outer surface of the diaphragm; and a volume-varying member which is disposed near the forming tool between the diaphragm and the support so that at least a portion thereof is positioned on the second part of the material.

18 Claims, 12 Drawing Sheets

(51) Int. Cl.
*B29C 51/26* (2006.01)
*B29C 51/42* (2006.01)

(58) Field of Classification Search
CPC ... B29C 51/008; B29C 51/266; B29C 70/541; B29C 70/44; B29C 2043/3233; B29C 43/36; B29C 2043/3647; B29D 99/0003
See application file for complete search history.

(56) References Cited

FOREIGN PATENT DOCUMENTS

| | | |
|---|---|---|
| JP | 2006-137066 A | 6/2006 |
| JP | 2012-218436 A | 11/2012 |
| JP | 2019-162758 A | 9/2019 |

* cited by examiner

MATERIAL FORMING APPARATUS USING DIAPHRAGM AND MATERIAL FORMING METHOD USING DIAPHRAGM

TECHNICAL FIELD

The present invention relates to a material forming apparatus and a material forming method, and more particularly, to an apparatus and a method for forming a thermoformable material or a composite material using thermoformable material as a matrix.

BACKGROUND ART

Composite materials using thermoformable materials, such as thermosetting resin, and thermoplastic resin, as a matrix are utilized in various fields owing to multifunctional superiority. For instance, a unidirectional carbon fiber composite material is increasing the use in aircrafts or structure of equipment related to transportation since having mechanical properties for its weight. However, the composite material is difficult to manufacture a structure using the composite material because of complication in the shape to be manufactured and an increase of size, and has a limitation in wide application due to an increase of manufacturing costs.

There are lots of studies on composite material manufacturing processes in order to overcome the limitations. Especially, in the case that the shape to be formed has a convex or concave double curvature like a spherical surface, a defect that the composite material is creased may occur during forming. There are many attempts to overcome the defect.

As a representative example of such attempts, there is a diaphragm forming process. In the diaphragm forming process, diaphragms are respectively arranged at both sides of a preform made by the composite material cut in a predetermined form. After that, pressure is applied to the diaphragms, a vacuum is created in the diaphragms of the composite material preform, or pressure and vacuum are applied at the same time so that the diaphragms compress both sides of the composite material preform. Therefore, the composite material preform and the diaphragms are closely pressed and are covered on a forming tool manufactured in a desired shape. So, the composite material preforms can be formed in a desired shape.

When both sides are formed in the state being pressed by the diaphragms, tensile force formed by elasticity inside the diaphragms restrains wrinkling of the material, namely, the composite material preform. Therefore, the material can be formed without wrinkling even though the desired shape has a convex or concave double curvature.

However, in spite of the double-sided diaphragm pressing method, if the composite material to be formed is thick or large-sized or if the shape to be formed has a convex or concave curvature which is severely curved, because the propensity for the material to be wrinkled is greater than the propensity for the diaphragms to restrain wrinkling, a defect that the material is creased occurs.

In addition, as described above, according to the double-sided diaphragm pressing method, the diaphragms remain between the composite material and the forming tool. For this reason, when a hardening process is required after forming, it is necessary to separate the formed material and the diaphragms from the forming tool after forming. The formed shape may be damaged during this separation process. Additionally, when the material is applied to the forming tool again for hardening after separating the diaphragms, there is a big problem that hardening cannot be performed properly if the dimensions do not match.

That is, the existing double-sided diaphragm compression method provides the possibility of forming a shape with a double curvature, but there is a large limitation in forming in the thickness or size of the applicable composite material, and there is a gap between the material and the forming tool. It is difficult to apply to actual article manufacturing due to the diaphragm remaining between the material and the forming tool.

Additional attempts have been made to improve the diaphragm process to overcome these problems, namely, the limitation of forming, and to improve dimensional accuracy. For example, as in the conventional diaphragm method described above, an improved method of compressing both sides of the material by two diaphragms to prevent the material from wrinkling during forming and of directly applying a material to a forming tool by removing the diaphragms existing between the material and the forming tool at the time that forming is finished has been proposed.

However, the improved method also has several problems in that the structure of the two diaphragms and the structure of the pressure cells are complicated, and in that little is known about examples that such improved method has been applied to actual production excepting small trial articles due to difficulty in actual implementation.

Recently, a technology to produce composite materials with complex shapes by automated robots has been developed, but it has disadvantages in that manufacturing cost is high and it takes long process time. So, a material forming apparatus and a material forming method, which have a relatively simple structure, are low in manufacturing cost, and are applicable to articles with complex shapes and large sizes, are required.

DISCLOSURE

Technical Problem

Accordingly, the present invention has been made in an effort to solve the above-mentioned problems occurring in the prior arts, and it is an object of the present invention to provide a material forming apparatus and a material forming method capable of forming a material that is prone to wrinkle defects during forming, such as a composite material, into a complex curved surface without wrinkle defects.

It is another object of the present invention to provide a material forming apparatus and a material forming method capable of easily performing a hardening process without any remaining foreign matters, such as diaphragms, between the material and a forming tool after forming. Moreover, it is a further object of the present invention to provide a material forming apparatus and a material forming method capable of overcoming the limits of the conventional forming technology in terms of the shape, size, thickness, etc. of formed articles.

Technical objects to be achieved by the present invention are not limited to the above-described objects and other technical objects that have not been described will be evidently understood by those skilled in the art from the following description.

Technical Solution

To achieve the above objects, the present invention provides a material forming apparatus, which forms an article by transforming a sheet-shaped material to conform the surface of a forming tool, the material forming apparatus including: a support which is positioned at a side of the forming tool based on a material arranged on the forming tool to have a first part covered by the forming tool and second parts deviating from the forming tool, and which supports the forming tool; a diaphragm which has the outer surface on which the material is located and the inner surface on which fluid pressure for expansion is provided, wherein the outer surface of the expanding diaphragm presses the second parts of the material while getting in contact with the second parts in a state where the first part of the material is compressed by the forming tool and the outer surface of the diaphragm; and a volume-variable member which is disposed near the forming tool between the diaphragm and the support so that at least a portion thereof is positioned on the second part of the material, wherein the second part of the material is compressed on the surface of the volume-variable member by the expanding diaphragm, and which suppresses wrinkling of the material and allows the second part of the material to approach the forming tool according to the continuous expansion of the diaphragm in a state in which the second part of the material is compressed onto the surface of the volume-variable member by the diaphragm and the second part is compressed by the diaphragm and the volume-variable member.

In an embodiment of the present invention, the volume-variable member is a balloon or an elongated tube capable of being selected according to a shape of the forming tool.

In an embodiment of the present invention, in a state where the second part of the material is compressed by the diaphragm and the volume-variable member, as the diaphragm continues to expand, the volume is gradually decreased in a state where the volume-variable member is restricted by the surface of the forming tool and the support, and the volume-variable member is separated between the second part of the material and the forming tool at the time that forming is finished, so that the second part of the material is formed to conform the surface of the forming tool.

In an embodiment of the present invention, the material is a thermoformable material or a composite material using the thermoformable material as a matrix, and the diaphragm is a transformable diaphragm.

In an embodiment of the present invention, a structure capable of selectively opening and shielding on a lateral direction between the support and the diaphragm is provided such that an operator can insert the hand or a tool in order to adjust the position of the volume-variable member.

In an embodiment of the present invention, the forming tool has a pressing surface for compressing the first part of the material and a side surface connected to the pressing surface, the pressing surface and the side surface are one of a flat surface, a concave surface, and a convex surface so that the forming tool has a double curvature, and the volume-variable member is located at the side surface.

In an embodiment of the present invention, the material forming apparatus further includes a heating unit disposed to approach the material to transfer heat to the material.

In an embodiment of the present invention, the material forming apparatus further includes a clamp for clamping an edge of the diaphragm to form an airtight state for fluid pressure provided to the inner surface of the diaphragm.

In an embodiment of the present invention, provided is a material forming apparatus which forms an article by transforming a sheet-shaped material to conform the surface of a forming tool, the material forming apparatus including: a support which is positioned at a side of the forming tool based on a material arranged on the forming tool to have a first part covered by the forming tool and second parts deviating from the forming tool, and which supports the forming tool; a diaphragm which has the outer surface on which the material is located and the inner surface on which fluid pressure for expansion is provided, wherein the outer surface of the expanding diaphragm presses the second parts of the material while getting in contact with the second parts in a state where the first part of the material is compressed by the forming tool and the outer surface of the diaphragm; and a heating unit disposed near to the material to transfer heat to the material.

In an embodiment of the present invention, the heating unit is located between the outer surface of the diaphragm and the first part of the material, and is narrower than the first part of the material so that the diaphragm does not interrupt forming of the second part of the material.

In an embodiment of the present invention, the material forming apparatus further includes a volume-variable member. The volume-variable member is disposed near the forming tool between the diaphragm and the support so that at least a portion thereof is positioned on the second part of the material, wherein the second part of the material is compressed on the surface of the volume-variable member by the expanding diaphragm. The volume-variable member suppresses wrinkling of the material and allows the second part of the material to approach the forming tool according to the continuous expansion of the diaphragm in a state in which the second part of the material is compressed onto the surface of the volume-variable member by the diaphragm and the second part is compressed by the diaphragm and the volume-variable member.

In an embodiment of the present invention, there is provided a material forming method for forming an article by transforming a sheet-shaped material to conform the surface of a forming tool, the material forming method including the steps of: arranging the material and the forming tool on the outer surface of the diaphragm so that the material has a first part covered by the forming tool and second parts deviating from the forming tool; locating a volume-variable member near the forming tool between the diaphragm and a support, which faces the outer surface of the diaphragm and supports the forming tool; expanding the diaphragm by fluid pressure applied to the inner surface of the diaphragm and compressing the second part of the material on the surface of the volume-variable member when the outer surface of the expanding diaphragm presses the second part of the material in a state where the first part of the material is compressed by the forming tool and the outer surface of the diaphragm; and decreasing the volume of the volume-variable member according to the continuous expansion of the diaphragm in a state in which the second part of the material is compressed onto the surface of the volume-variable member by the diaphragm and the second part is compressed by the diaphragm and the volume-variable member, so as to suppress wrinkling of the material and transform the second part of the material.

In an embodiment of the present invention, the step of arranging the material and the forming tool includes a step of arranging a heating unit between the outer surface of the diaphragm and the first part of the material to transfer heat to the material.

In an embodiment of the present invention, in the step of locating the volume-variable member in the vicinity of the forming tool, the volume-variable member is a balloon or an elongated tube capable of being selected according to a shape of the forming tool, and is located on the side of the forming tool.

In an embodiment of the present invention, the step of locating the volume-variable member in the vicinity of the forming tool includes the steps of: locating the volume-variable member in the vicinity of the forming tool so that at least a portion of the volume-variable member is located on the second part of the material; and pressing the forming tool by the support to compress the first part of the material by the outer surface of the diaphragm and the forming tool.

In an embodiment of the present invention, the forming tool includes a pressing surface for compressing the first part of the material and a side surface connected to the pressing surface. In the step of locating the volume-variable member in the vicinity of the forming tool, the volume-variable member is located on the side of the forming tool so that the volume-variable member can correspond to a position where the variable-volume member is predicted to be a wrinkle-prone region of the second part of the material.

In an embodiment of the present invention, the transforming step includes a step of continuously expanding the diaphragm in a state where the second part of the material is compressed by the diaphragm and the volume-variable member, gradually decreasing the volume in a state where the volume-variable member is constrained by the surface of the forming tool and the support according to the continuous expansion of the diaphragm, and separating the volume-variable member between the second part of the material and the forming tool at the time that forming is finished, so that the second part of the material is laminated on the surface of the forming tool.

In an embodiment of the present invention, the material forming method further includes at least one of the steps of: stopping the expansion of the diaphragm, and adjusting the position of the volume-variable member between the second part of the material and the forming tool by the operator's hand or with a tool; detaching the volume-variable member, and mounting it between the second part of the material and the forming tool again; and replacing the volume-variable member.

In an embodiment of the present invention, the step of laminating the second part of the material on the surface of the forming tool, further comprising a step of: laminating additional material on the surface of the forming part at least once more, wherein the step of laminating the additional material includes the steps of: separating the material coated on the forming tool from the outer surface of the diaphragm; locating additional material between the outer surface of the diaphragm and the material coated on the forming tool; and laminating the additional material on the previous material by performing the steps of locating a volume-variable member with respect to the additional material, compressing the additional material on the volume-variable member, and transforming the second part of the material in sequential order.

In an embodiment of the present invention, the material forming method further includes the steps of: hardening the plurality of materials formed on the forming tool by repeating the steps of laminating the additional material so as to form a plurality of hardened layers of the materials; and separating the materials with the plurality of hardened layers from the forming tool.

Advantageous Effects

In order to prevent the occurrence of wrinkle defects during forming, because one diaphragm and a volume-variable member (a balloon or a tube) having a suitable shape according to a desired shape are used to compress the material during forming, the material forming apparatus and the material forming method according to an embodiment of the present invention can form the material without wrinkle defects. That is, instead of compressing both sides of the material by diaphragms, one side of the material is compressed by a diaphragm and the other side is compressed by a balloon or a tube.

As described above, by using the volume-variable member such as a balloon or tube, it is easy to design and implement the material forming apparatus, and losses (cost, material, time, etc.) due to a damage of the diaphragm can be reduced, and limitations in forming in connection with sizes or complex curved surfaces, can be improved remarkably.

The advantages of the present disclosure are not limited to the above-mentioned advantages, and other advantages, not specifically mentioned herein, will be clearly understood by those skilled in the art from the following description.

MODE FOR INVENTION

Figure 1:
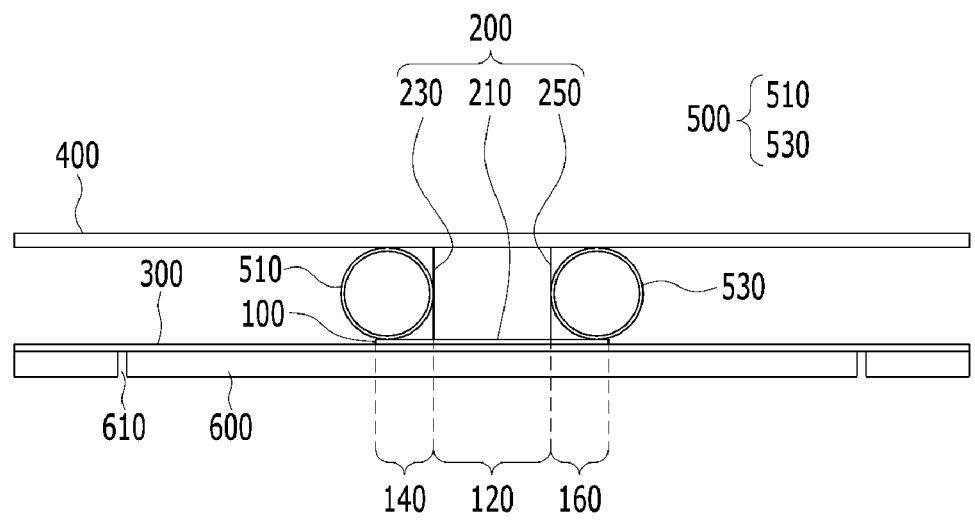
FIG. 1 is a view illustrating a material forming apparatus according to an embodiment of the present invention.
Figure 1:
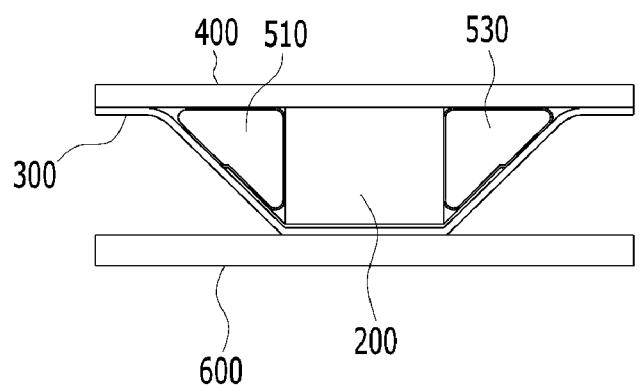

Hereinafter, the present invention will be described in detail with reference to the accompanying drawings. However, embodiments of the present invention may be implemented in several different forms and are not limited to the embodiments described herein. In addition, parts irrelevant to description are omitted in the drawings in order to clearly explain embodiments of the present invention. Similar parts are denoted by similar reference numerals throughout this specification.

Throughout this specification, when a part is referred to as being "connected, coupled, joined, or combined" to another part, this includes "direct connection" and "indirect connection" via an intervening part. Also, when a certain part "includes" a certain component, other components are not excluded unless explicitly described otherwise, and other components may in fact be included.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Hereinafter, referring to the attached drawings, preferred embodiments of the present invention will be described in detail.

Figure 2:
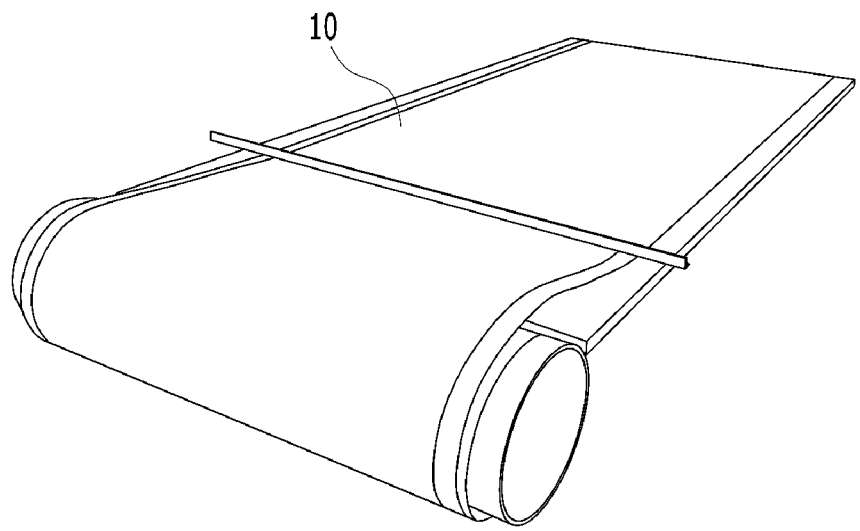
FIG. 2 is a view illustrating a material formed by the material forming apparatus according to an embodiment of the present invention.
Figure 2:
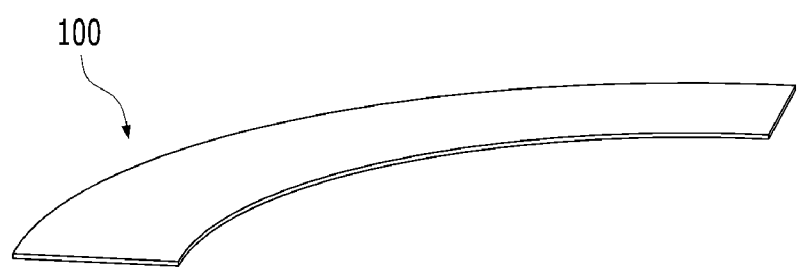
Figure 3:
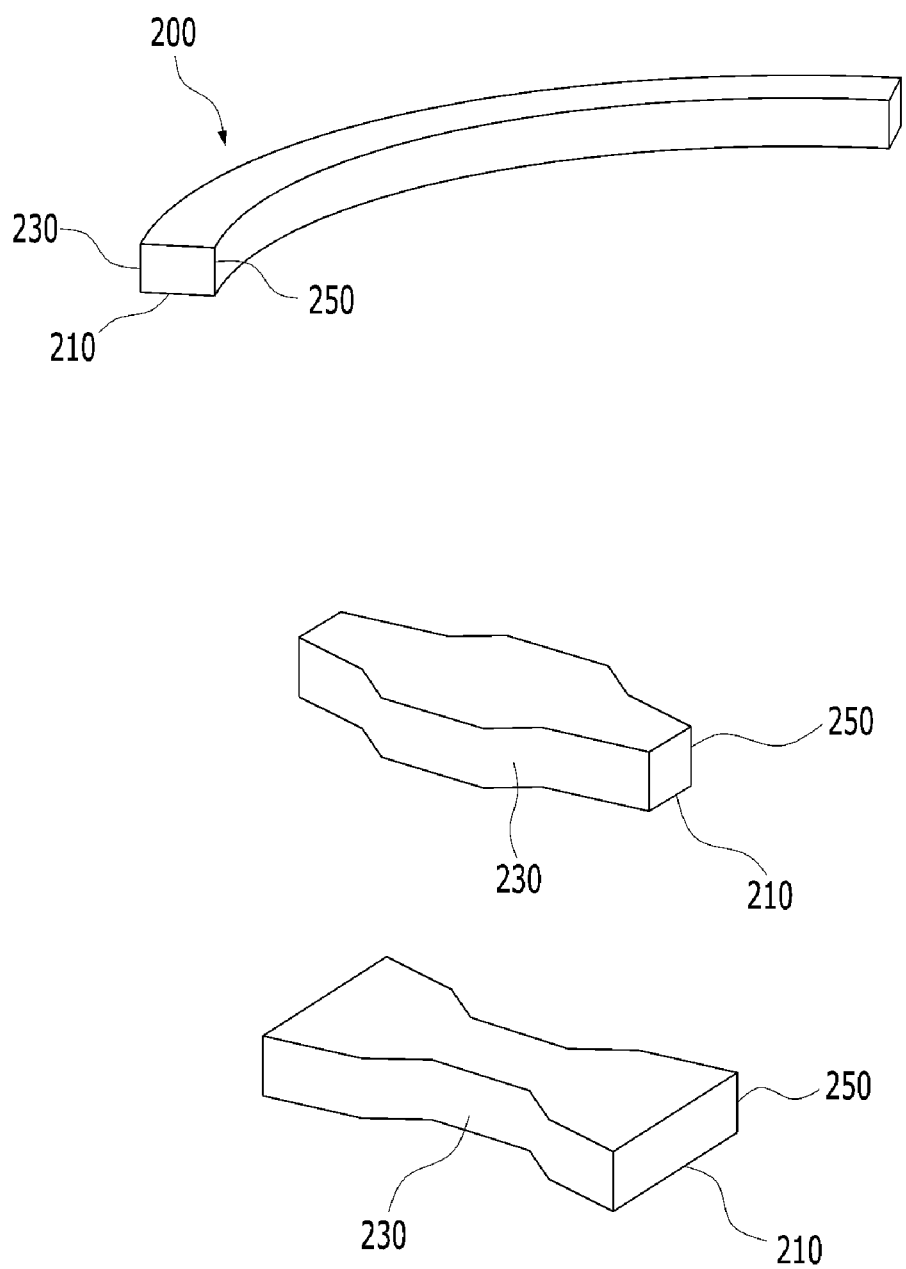
FIG. 3 is a view illustrating examples of a forming tool of the material forming apparatus according to an embodiment of the present invention.

FIG. 1 is a view illustrating a material forming apparatus according to an embodiment of the present invention. FIG. 2 is a view illustrating a forming tool 200 and a material 100 in the material forming apparatus according to an embodiment of the present invention. FIG. 3 is a view illustrating examples of a forming tool of the material forming apparatus according to an embodiment of the present invention.

The material forming apparatus is an apparatus for forming articles by transforming a sheet-shaped material (see FIG. 2) to be conformable to the surface of a forming tool 200 as illustrated in FIG. 3.

The material 100 may be a thermoformable material, or a composite material 10 (prepreg) using the thermoformable material as a matrix, or a preform cut into a specific shape (see the lower figure of FIG. 2).

In the case of n unidirectional fiber-reinforced composite material prepreg, the preform formed by cutting the prepreg may be placed on the forming tool 200 just in one direction. Alternatively, several layers having different directions may be stacked and formed together. In this instance, as a diaphragm is transformed, it can be prevented that the material is torn in a perpendicular direction to the fiber direction.

For instance, the composite material 10 to which the material forming apparatus is applied may be a unidirectional fiber-reinforced composite material, but may be applicable to other materials that may have wrinkle defects during the forming process.

Referring to FIG. 1, the material forming apparatus includes a support 400, a support frame 600, a diaphragm 300, and a volume-variable member 500.

The material forming apparatus according to this embodiment provides driving force using one diaphragm 300 to coat the material 100 on the forming tool 200 through expansion of the diaphragm 300, and on the opposite side of the diaphragm 300, the volume-variable member 500, such as a balloon, instead of the diaphragm 300, supports the material 100 to apply pressure to the material 100 not to wrinkle at the material 100.

The forming tool 200 having a shape corresponding to the shape of the article to be manufactured may be used in the material forming apparatus. For example, the material 100 may be disposed to partially cover the forming tool 200. That is, the material 100 may be disposed with respect to the forming tool 200 to have a first part 120 covered by the forming tool 200 and second parts 140 and 160 deviated from the forming tool 200.

The support 400 is located on the side of the forming tool 200 based on the material 100, and may be spaced apart from the forming tool 200 or moved to support the forming tool 200. The support 400 may have a plate shape. Alternatively, the support 400 may be formed in a shape of a long bar or a support. Several such bars or supports may support the forming tool 200.

Such a support in the shape of a bar or a support may have better access to the inside from the outside (e.g., lateral side) compared to a plate-shaped support. Accordingly, it is possible to relatively easily adjust the position of the volume-variable member 500, which will be described later, even before or during forming. For example, an operator may push the variable-volume member 500 by hand or with a stick so that the variable-volume member 500 becomes closer to the side of the forming tool 200.

The support frame 600 may support the diaphragm 300 to face the support 400.

The diaphragm 300 may include a transformable diaphragm. The diaphragm 300 may be made of soft (elastomeric) materials having good expansion and contraction characteristics. If the diaphragm 300 is formed of a material having a large elastic limit, it is reusable. Of course, when plastic deformation occurs in the diaphragm 300, it may be used once, and then, recycled or discarded.

The diaphragm 300 may have an outer surface on which the material 100 is placed and an inner surface on which a fluid pressure for expansion is provided. For example, an airtight space is formed between the diaphragm 300 and the support frame 600 to constitute a pressure cell. As illustrated in FIG. 1, as a fluid such as air flows into and out of the airtight space through a passage 610 formed in the support frame 600 so that the diaphragm 300 can be expanded, restored to its original state, or contracted.

In the state where the material 100 and the forming tool 200 are placed on the outer surface of the diaphragm 300 and the support 400 supports the forming tool 200, that is, in the state where the first part 120 of the material 100 is compressed by the forming tool 200 and the outer surface of the diaphragm 300, the diaphragm 300 may be expanded. Accordingly, as illustrated in the lower figure of FIG. 1, the outer surface of the expanded diaphragm 300 may be in close contact with the second parts 140 and 160 of the material 100 to pressurize the material 100.

The volume-variable member 500 may be disposed in the vicinity of the forming tool 200 between the diaphragm 300 and the support 400 so that at least a portion of the volume-variable member 50 is positioned on the second parts 140 and 160 of the material 100. As illustrated in FIG. 1, the second parts 140 and 160 of the material 100 may be compressed on the surface of the volume-variable member 500 by the expanding diaphragm 300.

Before the diaphragm 300 is expanded, the volume-variable member 500 may not come into contact with the support 400 or may come into contact with the support 400 from the beginning.

Figure 8:
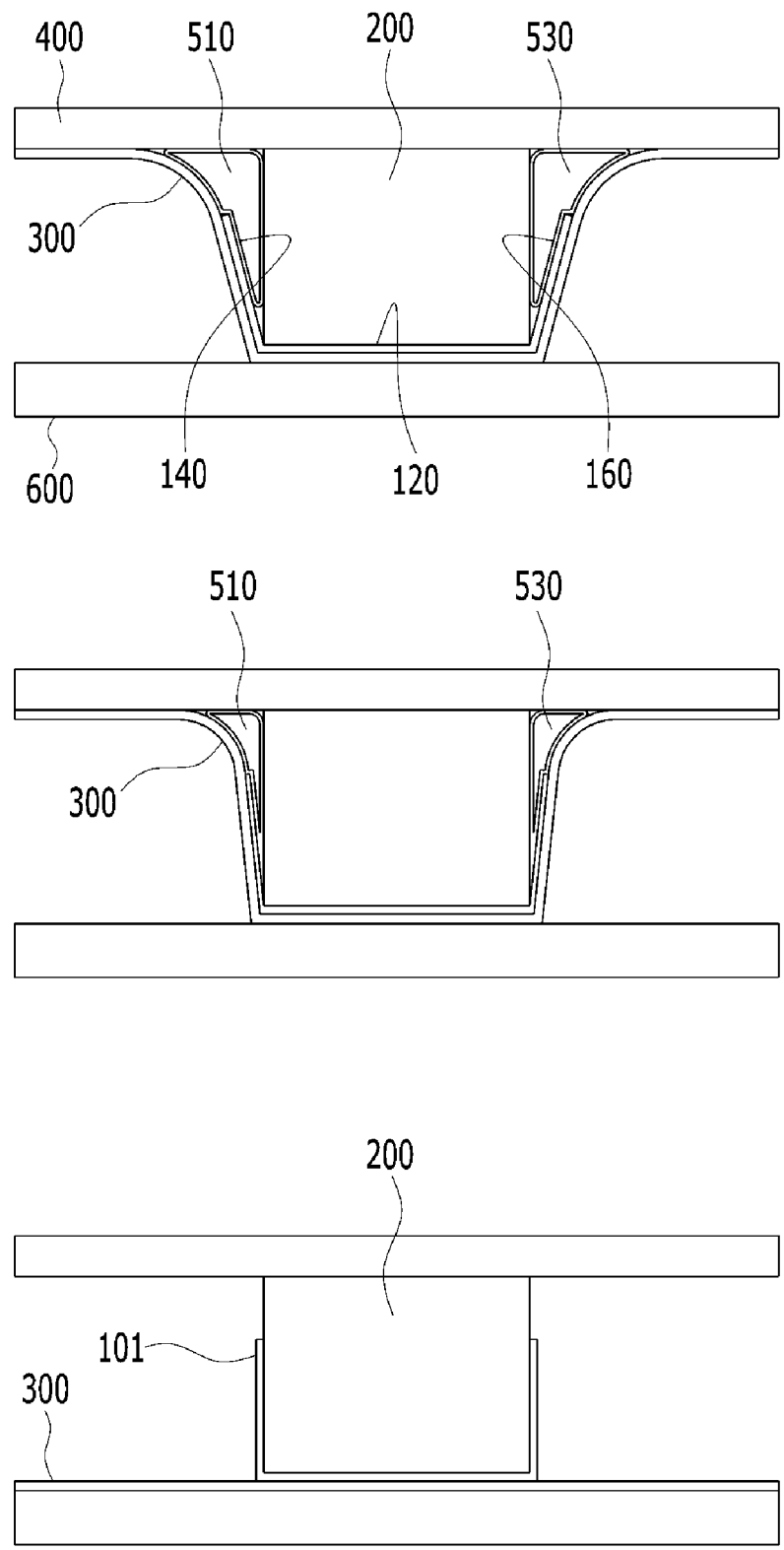
FIG. 8 is a view illustrating a method of forming a material by expansion of the diaphragm and contraction of the volume-varying member.

As the diaphragm 300 continues to expand in the state where the second parts 140 and 160 of the material 100 are compressed by the diaphragm 300 and the volume-variable member 500, wrinkling of the material 100 is suppressed, and the second parts 140 and 160 of the material 100 may be transformed or formed to be close to the forming tool 200 (see FIG. 8).

A structure capable of selectively opening and shielding may be provided in the lateral direction between the support 400 and the diaphragm 300. In this embodiment, at least a portion is opened in the lateral direction between the support 400 and the diaphragm 300.

In the conventional forming method using two diaphragms, it was impossible to stop the forming work during forming and check the material or the diaphragms. However, according to the present embodiment, if necessary, the position of the volume-variable member 500 may be adjusted during forming.

For example, when the volume-variable member 500 in the form of a balloon is about to deviate from its normal position, the expansion of the diaphragm 300 is stopped, and a rod or a tool, or the operator's hand is put in the lateral direction between the support 400 and the diaphragm 300 in order to push the volume-variable member 500 into a normal position (e.g., between the second parts 140 and 160 of the material 100 and the forming tool 200). Additionally, in some cases, the volume-variable member 500 may be pulled out by a tool or the hand inserted in the lateral open direction between the support 400 and the diaphragm 300 in the process of completing the forming process.

Referring to FIG. 3, the forming tool 200 may have a shape corresponding to the shape of an article to be manufactured. For example, the forming tool 200 may include a pressing surface 210 and a side surface connected to the pressing surface 210. The pressing surface 210 and the side surface may be one of a flat surface, a concave surface, and a convex surface. Accordingly, the forming tool 200 may have a double curvature.

In this embodiment, the forming tool 200 may include a pressing surface 210, an outer surface 230 having a curved shape, and an inner surface 250 having a curved shape corresponding to the outer surface 230. The pressing surface 210 may connect the inner surface 250 and the outer surface 230 and compress the first part 120 of the material 100 (see FIG. 1).

The inner surface 250 and the outer surface 230 may be parts of an arc concentric with each other.

Moreover, the inner surface 250 and the outer surface 230 may have a constant curvature in a perpendicular direction to the curvature of the concentric circle.

Depending on the shape to be manufactured, the material may be formed only on one side of the pressing surface, the inner surface and the outer surface.

After a hardening process, which will be described later, the inner surface 250 and the outer surface 230 are formed to be tapered by about 1 to 3 degrees with respect to the vertical surface to the pressing surface 210 to facilitate separation of the material 100 from a mold. The pressing surface 210 and the inner surface 250, and the pressing surface 210 and the outer surface 230 form curved surfaces at about 90 degrees, and the inner surface 250 and the outer surface 230 may be curved surfaces having the above-described curvature. The forming tool 200 may have the two curved surfaces. When the material 100 is simply applied to the forming tool 200, wrinkles may be formed due to the curved surfaces. However, according to the material forming apparatus according to the present embodiment, it is possible to apply the material to the forming tool 200 while suppressing wrinkling of the material.

The volume-variable member 500 may be a balloon or tube selectable according to the shape of the forming tool 200. The volume-variable member in the form of a tube is generally formed long, and may be made of a rubber material. However, the volume-variable member in the form of a tube is not limited to a rubber material.

The volume-variable member 500 may be arranged to fully or partially support the material around a region where the material tends to wrinkle. That is, the arrangement of the variable-volume member can be selectively made according to the shape of the forming tool. However, in this embodiment, an example in which the variable-volume member is disposed on the entire side of the forming tool will be described (see the lower figure of FIG. 7)).

In a state where the first part 120 of the material 100 is compressed by the pressing surface 210 and the diaphragm 300 of the forming tool 200, as the diaphragm 300 expands, the second part 140 of the material 100 on the outer surface 230 is compressed by the diaphragm 300 and the first volume-variable member 510, and the second part 160 of the material 100 on the inner surface 250 is compressed by the diaphragm 300 and the second volume-variable member 530.

Figure 4:
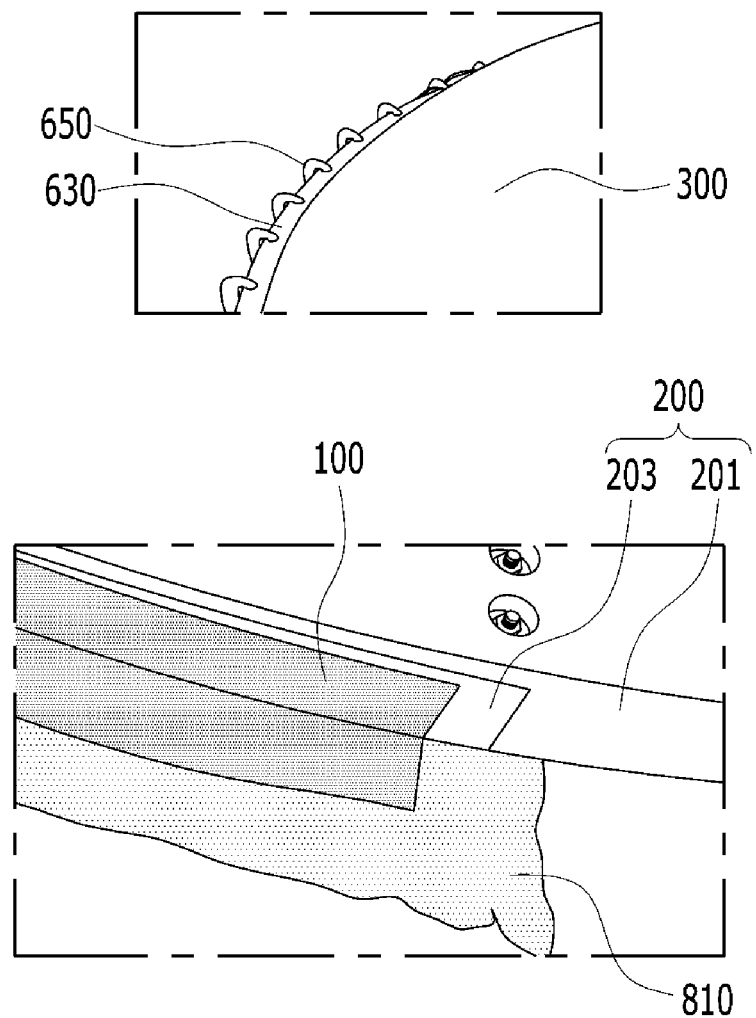
FIG. 4 is a view illustrating a diaphragm and a forming tool of the material forming apparatus according to an embodiment of the present invention.

FIG. 4 is a view illustrating an example of the diaphragm 300 and the forming tool 200 of the material forming apparatus according to an embodiment of the present invention.

The edge of the diaphragm 300 is bonded to the support frame 600, so that a space between the diaphragm 300 and the support frame 600 is in an airtight state for fluid pressure. Alternatively, referring to the upper figure of FIG. 4, the diaphragm 300 and the support frame 600 may be coupled by a plurality of clamps 650. For example, an edge plate 630 pressing the edge of the diaphragm 300 may be arranged, and the clamp 650 presses the edge plate 630 and the support frame 600 to form the airtight space.

Meanwhile, referring to the lower figure of FIG. 4, a release member 810 may be interposed between the outer surface of the diaphragm 300 and the material 100 for a relative movement of the diaphragm and the material and for separation after forming.

Figure 5:
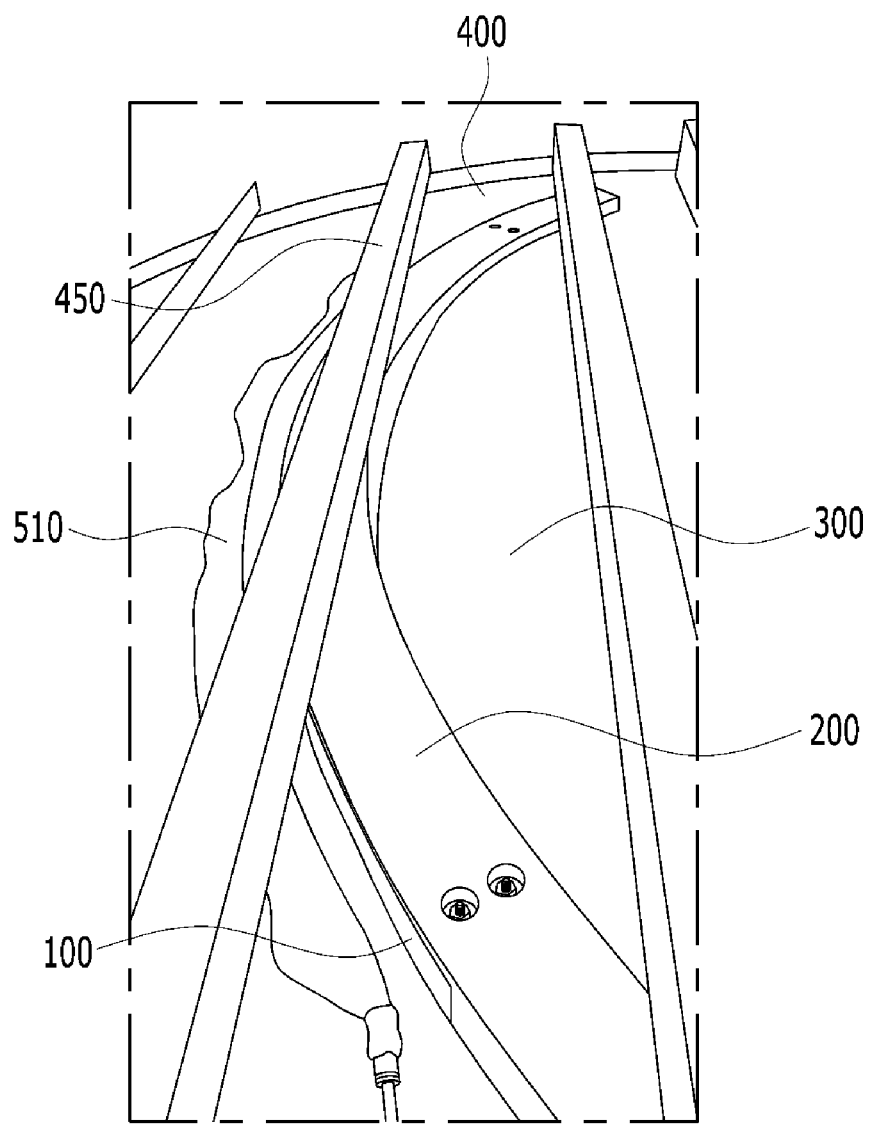
FIG. 5 is a view illustrating a volume-varying member separated from the material and the forming tool.

FIG. 5 is a view illustrating an example of the volume-variable member 500 separated from between the material 100 and the forming tool 200.

As the diaphragm 300 continues to expand in the state where the second parts 140 and 160 of the material 100 are compressed by the diaphragm 300 and the volume-variable member 500, the outer surface of the diaphragm 300 pressurizes the surface of the volume-variable member 500. Therefore, volume gradually decreases in the state where the volume-variable member 500 is constrained by the surfaces (e.g., the inner surface 250 and the outer surface 230) of the forming tool 200 and the support 400.

In the example illustrated in FIG. 5, the support 400 is in the form of a transparent plastic plate, namely, polycarbonate plate, and a square pipe 450 is reinforced in order to reinforce the plastic plate.

As the diaphragm 300 continues to expand, as illustrated in the lower figures of FIGS. 5 and 8, the volume-variable member 500 is separated between the second parts 140 and 160 of the material 100 and the side surface of the forming tool 200 so that the second parts 140, 160 of the material 100 are formed to follow or conform to the surface of the forming tool 200. As a result, the material 100 may be laminated on the surface of the forming tool 200.

In this embodiment, after the material 100 is transformed toward the surface of the forming tool 200 while suppressing wrinkling by the diaphragm 300 and the volume-variable member 500, in a finishing process of completely coating the material 100 on the forming tool, the operator presses the material 100 onto the surface of the forming tool 200 with a roller or the hand to finish the forming process.

The forming process of the material 100 may be repeated several times to form an article with a desired thickness. The process of repeating the forming several times will be further described later.

The conventional material forming apparatus having a plurality of pressure cells using two diaphragms is complicated and is difficult to implement actually. However, the material forming apparatus according to an embodiment of the present invention uses the single diaphragm 300 and includes the volume-variable member 500 in the form of a balloon or a tube which is simple in handling and structure. Therefore, the material forming apparatus according to an embodiment of the present invention can be conveniently applied to manufacture articles actually, reduce manufacturing costs, and remarkably reduce limitations in size or shape of the material.

Figure 6:
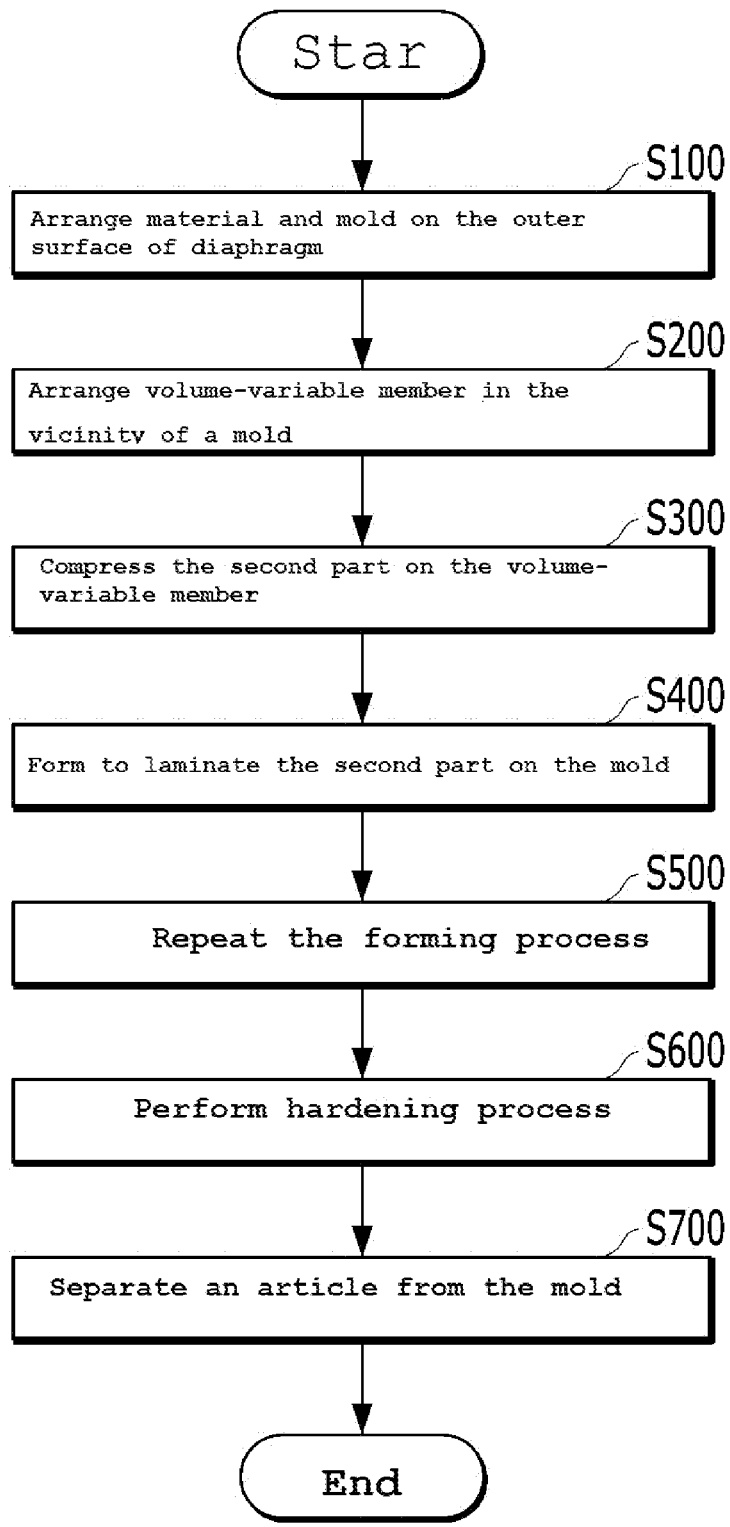
FIG. 6 is a flow chart illustrating a material forming method according to an embodiment of the present invention.

FIG. 6 is a flow chart illustrating a material forming method according to an embodiment of the present invention.

The material forming method includes a process (S100) of arranging a material 100 and a forming tool 200 on the outer surface of a diaphragm 300 so that the material 100 has a first part 120 covered by the forming tool 200 and second parts 140 and 160 deviated from the forming tool 200.

When the second parts 140 and 160 of the material is pressed against the surface of the variable-volume member 500, in the above process (S100) that the variable-volume member 500 is positioned near the forming tool 200 to correspond to a position where the variable-volume member 500 is predicted to be a wrinkle-prone region between the second parts 140 and 160 of the material, the variable-volume member 500 is positioned on the side of the forming tool 200.

On the other hand, as described above, the material 100 is a thermoformable material or a composite material using the thermoformable material as a matrix, and may be at least one among a composite material made of unidirectional fiber, woven fabric prepreg, and aligned discontinuous fiber composite prepreg. The diaphragm 300 may be made of a transformable material.

Next, a volume-variable member 500 is positioned in the vicinity of the forming tool 200 between the diaphragm 300 and the support 400 that faces the outer surface of the diaphragm 300 and supports the forming tool 200 (S200).

Subsequently, after the diaphragm 300 is expanded by the fluid pressure applied to the inner surface of the diaphragm 300 and the first part 120 of the material 100 is compressed by the forming tool 200 and the outer surface of the diaphragm 300, the outer surface of the expanded diaphragm 300 presses the second parts 140 and 160 of the material 100 so that the second parts 140 and 160 of the material 100 are compressed against the surface of the volume-variable member 500 (S300).

Next, in the state where the second parts 140 and 160 of the material 100 are compressed by the diaphragm 300 and the volume-variable member 500, as the diaphragm 300 continues expansion, the volume of the volume-variable member 500 decreases, wrinkling of the material 100 is suppressed, and the second parts 140 and 160 of the material 100 are transformed (S400).

Hereinafter, the material forming method will be described in more detail using the material forming apparatus illustrated in FIGS. 1 to 5.

Figure 7:
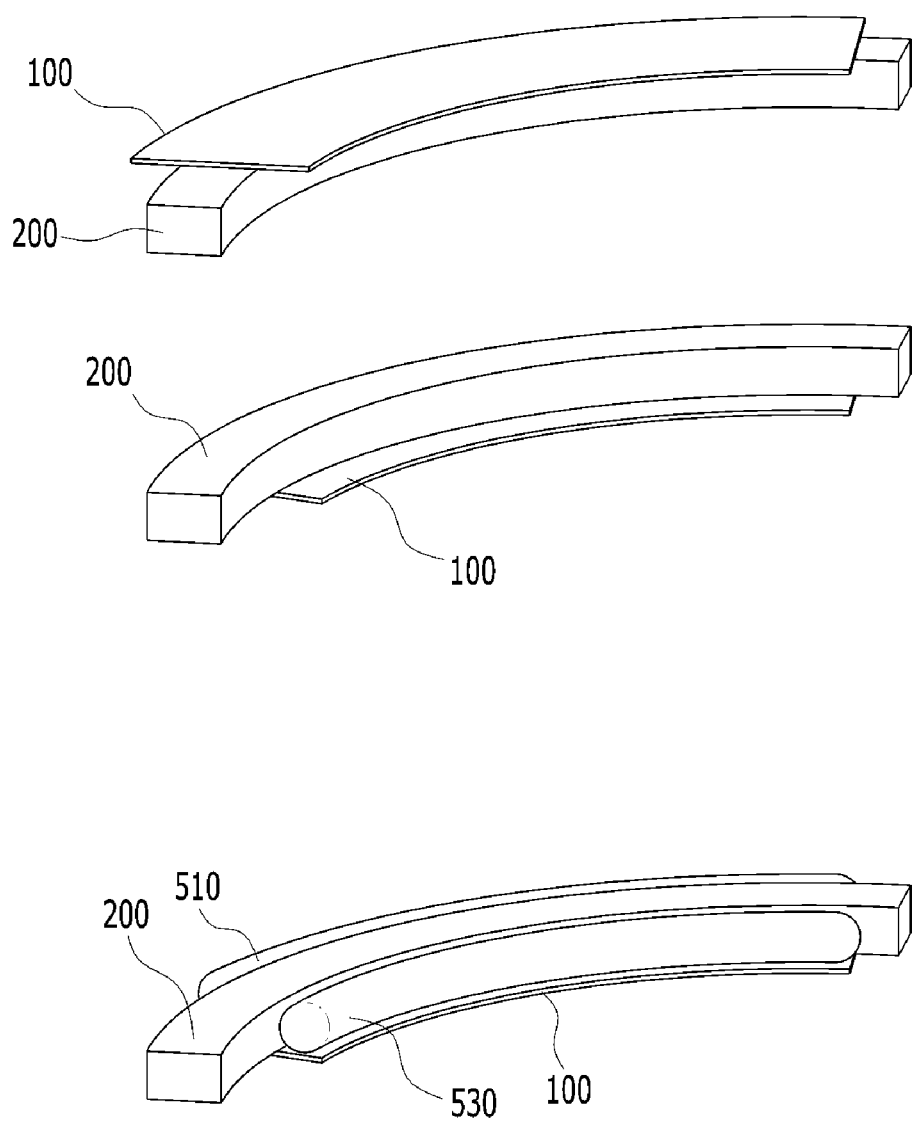
FIG. 7 is a view illustrating relationship among the material, the forming tool and the volume-varying member.

FIG. 7 is a view illustrating an example of relationship among the material 100, the forming tool 200, and the volume-variable member 500.

The process of positioning the volume-variable member 500 in the vicinity of the forming tool 200 includes the steps of: positioning the volume-variable member 500 in the vicinity of the forming tool 200 so that at least a part of the volume-variable member 500 is located on the second parts 140 and 160 of the material 100; and pressing the forming tool 200 and the volume-variable member 500 with the support 400 to compress the first part 120 of the material 100 with the outer surface of the diaphragm 300 and the forming tool 200.

In the process of positioning the volume-variable member 500, a balloon or a tube that may be selected according to the shape of the forming tool 200 as the volume-variable member 500 may be located along the side of the forming tool 200. The volume-variable member 500 may have a shape capable of compressing a portion of the material 100 that is prone to wrinkles during forming.

In the state where the material 100 is disposed on the pressing surface 210 of the forming tool 200, as shown in the middle figure of FIG. 7, the process is performed such that the material is located on the lower side. It will be described referring to FIGS. 1 to 5. With respect to the above, you can refer to FIGS. 1 to 5. Alternatively, the material 100 is disposed on the pressing surface 210 of the forming tool 200, and then, as shown in the upper figure of FIG. 7, the process is performed by placing the material on the upper side. In this instance, the material forming apparatus illustrated in FIG. 1 is installed to be turned over so that the diaphragm 300 is located on the upper side. Hereinafter, an example of the middle figure of FIG. 7 will be mainly described.

As described above, in the case that the forming tool 200 has the inner surface 250, the outer surface 230, and the pressing surface 210, the material 100 is arranged to have a first part 120 corresponding to the pressing surface 210, and second parts 140 and 160 respectively extending in the substantially perpendicular direction to the inner surface 250 and the outer surface 230. In order to facilitate separation between the material and the forming tool 200, the inner surface 250 and the outer surface 230 are formed to be tapered at about 1 to 3 degrees in the vertical direction as described above.

In this instance, the process of positioning the volume-variable member 500 includes arranging a first volume-variable member 510 extending along the outer surface 230 and arranging a second volume-variable member 530 extending along the inner surface 250 (see the lower figure of FIG. 7).

FIG. 8 is a view illustrating an example of a method of forming the material 100 by expansion and contraction of the volume-variable member 500.

In the process in which the second parts 140 and 160 of the material 100 are compressed on the surface of the volume-variable member 500, in order to compress both sides 140 and 160 of the second part of the material 100, in the state where the first part 120 of the material 100 is compressed by the pressing surface 210 and the diaphragm 300 of the forming tool 200, as the diaphragm 300 expands, the second part 140 of the material 100 located on the outer surface 230 is compressed by the diaphragm 300 and the first volume-variable member 510, and the second part 160 of the material 100 located on the inner surface 250 is compressed by the diaphragm 300 and the second volume-variable member 530.

Next, in the process of suppressing wrinkling of the material and transforming or forming the second parts 140 and 160 of the material 100, as the diaphragm 300 continues to expand in a state where the second parts 140 and 160 of the material 100 are compressed by the diaphragm 300 and the volume-variable member 500, as the diaphragm 300 continues to expand, the volume is gradually reduced in a state where the volume-variable member 500 is constrained by the outer surface of the diaphragm 300, the surface of the forming tool 200, namely, the inner surface and the outer surface, and the support 400 (see upper and middle figures in FIG. 8).

The volume-variable member 500 includes a balloon or a tube made of an elastic material and a valve mounted thereon. During forming, the volume of the variable-volume member 500 may be gradually reduced by manipulating the valve or discharging air in a preset method. In this instance, the volume may be reduced while maintaining the pressure for pressing the material 100 so as to suppress the generation of wrinkles against the diaphragm 300. For example, the valve may be adjusted or set so that the pressure applied to the material by the volume-variable member 500 whose volume is decreasing is constant or is changed to have set values according to timing of the forming process.

Owing to the above process, the second parts 140 and 160 of the material 100 may be transformed to respectively approach the inner surface 250 and the outer surface 230 of the forming tool 200.

Furthermore, in the process in which the second parts 140 and 160 of the material 100 are transformed or formed while suppressing the generation of wrinkles in the material 100, the diaphragm 300 continues to expand after the gradual volume reduction process of the volume-variable member 500. Thus, since the volume-variable member 500 is separated between the second parts 140 and 160 of the material 100 and the forming tool 200, the material forming method further includes a process of laminating the second parts 140 and 160 of the material 100 on the surface of the forming tool 200 (see the lower figure of FIG. 8).

That is, when the volume-variable member 500 in which almost all of the air remaining between the side surfaces of the material 100 and the forming tool 200 is removed at the time when the forming is finished, the material 100 is in perfect contact with the surface of the forming tool 200 so as to complete the first forming.

Compared with the conventional forming method using two diaphragms, the material forming method according to this embodiment has a difference in that the material 100 and the forming tool 200 directly contact or face each other without any diaphragm or foreign matter at the time the forming is finished. That is, since there is no foreign matter between the material 100 and the forming tool 200, if the material 100 which is thin is formed several times, the material 100 can be formed to a desired thickness.

In the process in which the second parts 140 and 160 of the above-described material 100 are compressed on the surface of the volume-variable member 500 or in the process in which the second parts 140 and 160 of the material 100 are transformed or formed while suppressing wrinkling of the material 100, if necessary, the material forming method may further include a process of adjusting the position of the volume-variable member 500.

For example, the material forming method can adjust the position of the volume-variable member 500 by stopping the expansion of the diaphragm 300 and pushing in the volume-variable member 500, which is trying to be separated between the second parts 140 and 160 of the material 100 and the forming tool 200, into a normal position with a tool, such as a bar, or by the operator's hand.

Alternatively, in the case that the volume-variable member 500 is damaged, the volume-variable member 500 may be replaced relatively easily. In the case of the conventional forming process using a double diaphragm, damage such as the diaphragm bursting often occurred. When such a damage occurs, the operator must start the forming processes from the beginning again or discard the material.

However, according to the material forming apparatus according to the present embodiment, the case of discarding the material or having to start over from the beginning due to damage to the diaphragm 300 and the volume-variable member 500 hardly occurs. If the volume-variable member 500 is damaged, the operator can directly remove the volume-variable member 500 with a tool or by the hand, reduce the volume of the diaphragm 300 if necessary, install the normal volume-variable member 500, and then, resume the process of expanding the diaphragm 300. Alternatively, the operator may simply adjust the position of the volume-variable member 500 from the lateral direction using a tool, such as a rod, or by the hand.

Figure 9:
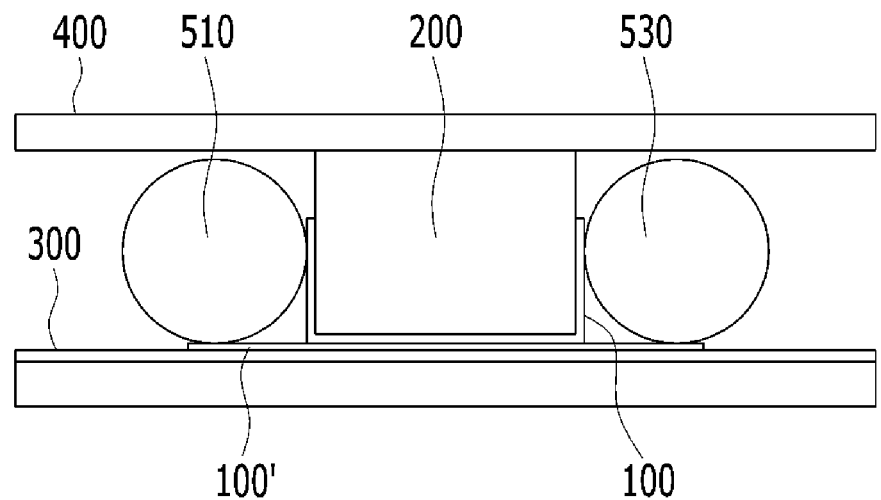
FIG. 9 is a view illustrating a process of repeating a material forming process.
Figure 9:
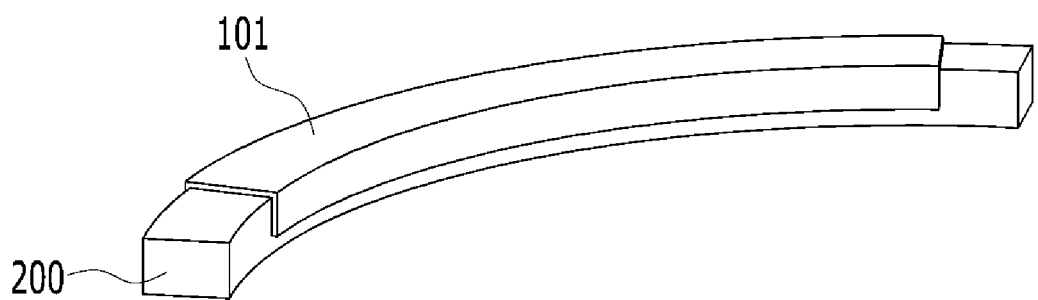

FIG. 9 is a view illustrating an example of a process of repeating the forming process of the material 100.

As described above, the process of forming one material 100 on the forming tool 200 is completed by the process in which the second parts 140 and 160 of the material 100 are coated on the surface of the forming tool 200.

An additional material 100' is placed on the forming tool 200 on which the material 100 is formed, and the forming process is repeated (S500). By selecting the number of repetitions of this process, the thickness of the formed article can be determined. Of course, the directions of the material 100 to be repeatedly formed may coincide with each other or may be arranged differently.

Specifically, the repetitive forming process includes, for example, the steps of: separating the material 100 coated on the forming tool 200 from the outer surface of the diaphragm 300; positioning the additional material 100' between the outer surface of the diaphragm 300 and the materials 100 coated on the forming tool 200; positioning the volume-variable member 500 with respect to the additional material 100'; compressing the additional material 100' on the surface of the volume-variable member 500; and transforming the second parts 140 and 160 of the additional material 100'. As a result, the additional material 100' is additionally coated on the material 100 so that the plurality of materials 101 can be formed on the forming tool 200 to a desired thickness without wrinkles as illustrated in the lower figure of FIG. 9.

Figure 10:
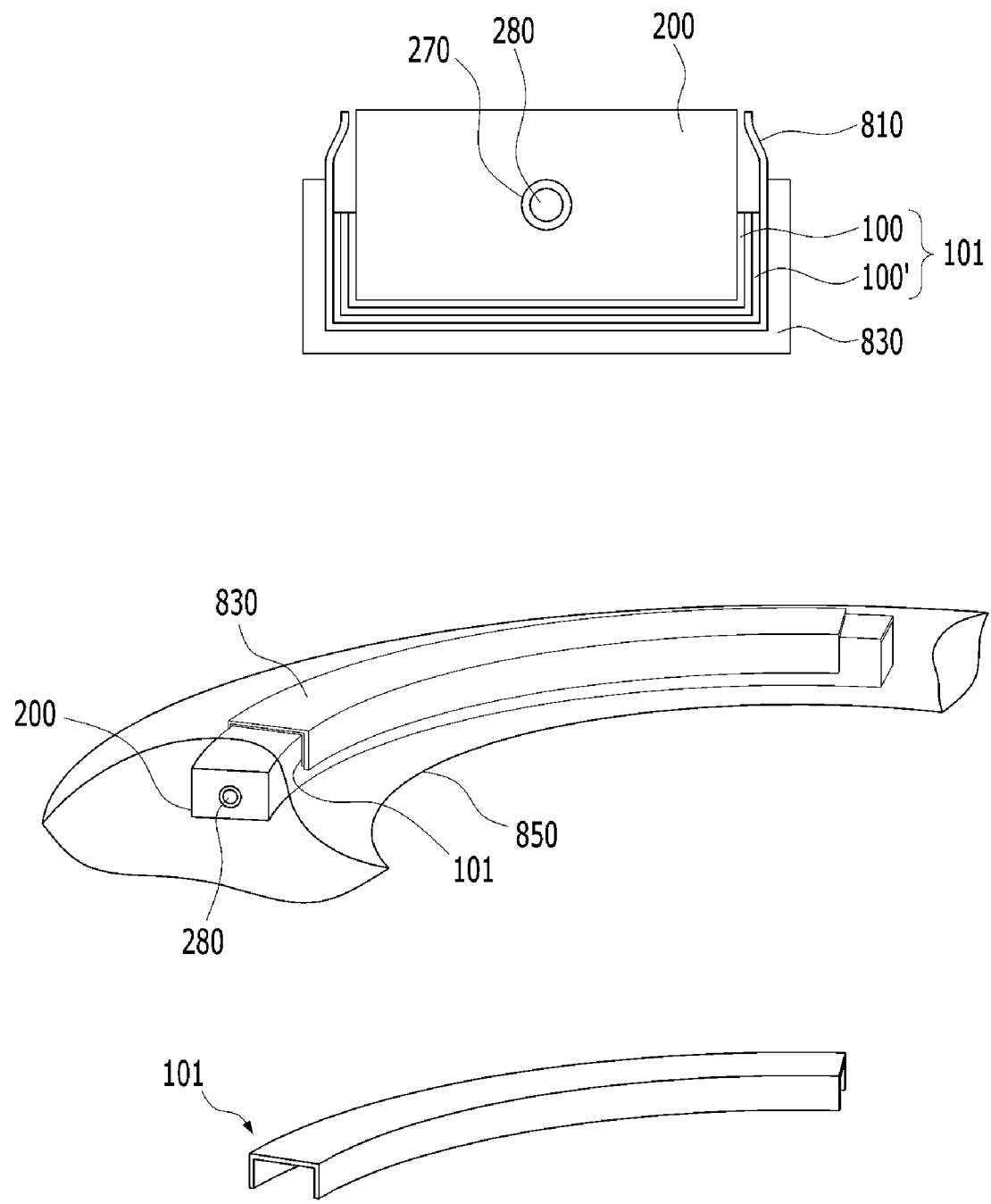
FIG. 10 is a view illustrating a hardening process after the repeated forming process.

FIG. 10 is a view illustrating an example of a hardening process after the forming process.

The material forming method may further include: a hardening process (S600) of hardening the plurality of materials 101 formed on the forming tool 200 by repeating the step of coating additional materials 100; and a process (S700) of separating the plurality of hardened materials 101, namely, a plurality of hardened material layers, from the forming tool 200. Of course, if the resin of the material does not require hardening, the hardening process may be omitted.

In the upper figure of FIG. 10, the additional material 101' is illustrated, and an appropriate number of additional materials 101' may be stacked according to the article to be manufactured.

For example, the hardening process includes the steps of: attaching an absorbent member 830 to the surface of the release member 810; sealing by pushing the forming tool 200 to which the release member 810 and the absorbent member 830 are attached into a vacuum pack 850; heating the forming tool 200 and absorbing a combination material, for instance, resin, from the plurality of materials 101 to the absorbent member 830; and taking the forming tool 200 from the vacuum pack 850 and separating the release member 810 from the hardened materials 101 (hardened layers).

In general, the hardening process may be carried out at high temperature and high pressure for several times using a heating device disposed in a high-temperature and high-pressure tank after putting the forming tool 200 in which the plurality of materials 101 are formed in the high-temperature and high-pressure tank, for instance, an autoclave.

On the other hand, the hardening process according to the present embodiment may be performed without using a separate heating device provided in the high-temperature and high-pressure tank during the absorption process. Specifically, in the hardening process according to the present embodiment, a heating wire 280 is mounted in a heater insertion hole 270 formed in the forming tool 200, and the heat generated from the heating wire 280 is transferred to the plurality of materials 100 through the forming tool 200 so as to facilitate extraction of the combination material, such as resin contained in the material.

Through the process, as an example of the manufactured article, a trial article of the form shown in the lower part of FIG. 10 was manufactured. The manufactured trial article was repeatedly formed to have an inner diameter of 2000 mm, an outer diameter of 2160 mm, a maximum length of 114.5 mm, a height of 40 mm, a thickness of about 1.5 mm, and the orientation of the fibers at 0 degrees, 90 degrees, 45 degrees, and −45 degrees. The material of the article was SKYFLEX USN150.

In the above-described embodiment, the case that the volume-variable member 500 is a balloon is described, but as the volume variable member 500, instead of the balloon, other device, for example, a tube or a spring structure or a piston structure, which has elasticity and an interface to conform to the material 100, may be applied to compress the material 100. Also, an inflatable device having a rubber or other transformable surface may be used in place of the diaphragm.

If the two conventional diaphragms are used, since the pressure cells of the diaphragms and a pressure cell between the diaphragms must be respectively controlled and an airtight structure must be achieved, the conventional art is difficult to apply actually due to complicity in structure and difficulty in implementation.

According to embodiments of the present invention, in order to prevent occurrence of wrinkle defects during forming, one diaphragm 300 (diaphragm) and the volume-variable member 500 (balloon) having a suitable shape according to the shape to be formed are used to compress the material 100 during forming. That is, differently from the conventional method that compresses both sides of the material 100 by the diaphragms, the method according to the present invention uses the diaphragm only on one side and uses the balloon on the other side.

As described above, by using the variable-volume member 500 like a balloon, the material forming apparatus can be easily designed and implemented, can reduce losses (cost, material 100, time, etc.) due to a damage of the diaphragm, and overcome the limitations in forming, such as sizes or complex curved surfaces.

Figure 11:
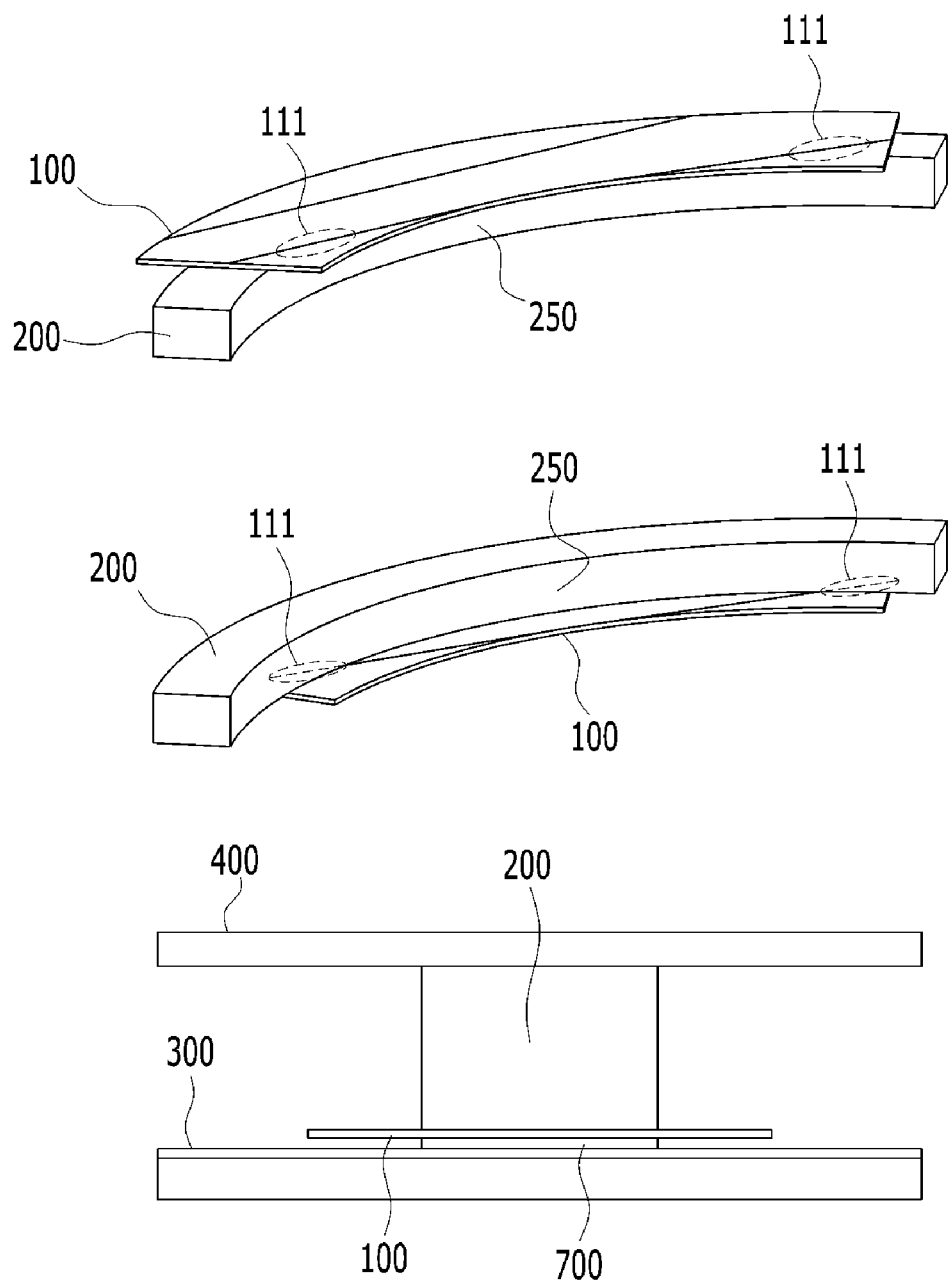
FIGS. 11 and 12 are views illustrating a material forming apparatus and a material forming method according to another embodiment of the present invention.
Figure 12:
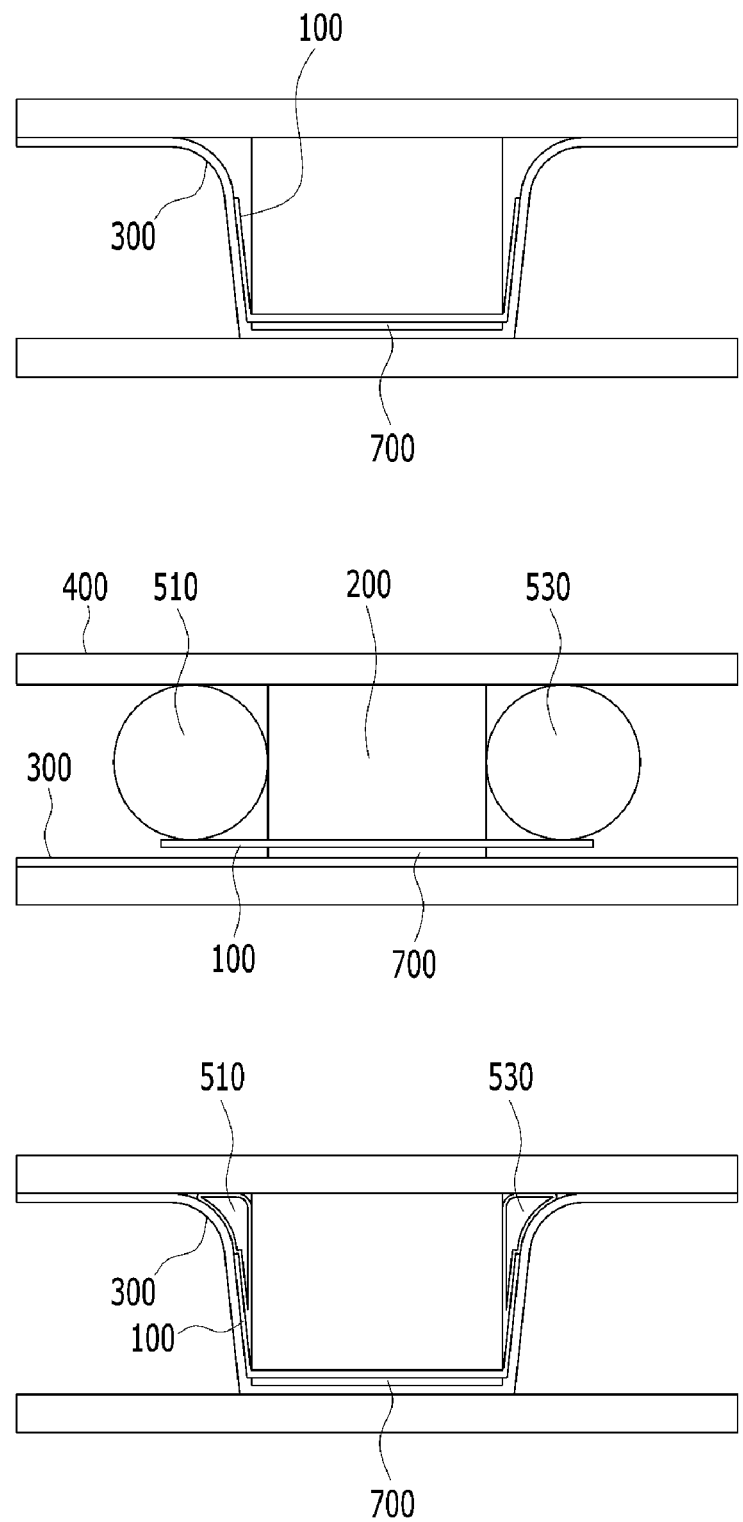

FIGS. 11 and 12 are views illustrating a material forming apparatus and a material forming method according to another embodiment of the present invention.

The material forming apparatus illustrated in FIGS. 11 and 12 further includes a heating unit, compared to the material forming apparatus and the material forming method described in FIGS. 1 to 9.

As described above, the material 100 is a thermoformable material or a composite material using the thermoformable material as a matrix, and may be at least one among a composite material made of unidirectional fiber, woven fabric prepreg, and aligned discontinuous fiber composite prepreg. Accordingly, as illustrated in FIG. 11, the material may include fiber formed to have directionality.

In the case of a unidirectional fiber composite material and a composite material including long seamless fibers, the fibers may be arranged long such that both ends among the fibers included in the material are arranged on the pressing surface and the central portion is located at the position corresponding to the concave side (see 111 of FIG. 11). In this instance, relative movement (slip) between the pressurized surface and the material is required for forming, but if the resin viscosity of the material is high, forming on the concave side may be limited.

If forming is performed in a state where heat is applied to the material 100, that is, when the material 100 is transformed, the viscosity of the resin can be lowered, so that the above-mentioned limitation in forming can be reduced. In order to achieve the above, the material forming apparatus according to this embodiment further includes a plate-shaped heating unit 700 which is located between the outer surface of the diaphragm 300 and the first part 120 of the material 100 to transfer heat to the material 100 (see the lower figure of FIG. 11).

When the material 100 and the forming tool 200 are arranged on the outer surface of the diaphragm 300, the heating unit 700 may be arranged between the outer surface of the diaphragm 300 and the first portion 120 of the material 100, heat is applied to the material 100 to transfer heat to the material 100 (see the lower figure of FIG. 11).

As described above, after the heating unit 700 is arranged and the diaphragm 300 is expanded, the material 100 is coated on the forming tool 200 as illustrated in the upper figure of FIG. 12 in order to perform the forming process.

Due to the heating unit 700, the material of a fiber portion 111 may be more easily transformed. Therefore, it is possible to effectively proceed with the forming.

In order to effectively apply heat to the material 100, the forming tool 200 is made of a material with high thermal conductivity, and the temperature of the material 100 is adjusted by controlling the temperature of the forming tool 200 during forming. The method of controlling the temperature of the material 100 by the temperature of the forming tool 200 may cause difficulty in transferring heat to the material 100 from the forming tool 200 as the thickness of the material 100 formed by sequential forming increases. Therefore, in order to solve the above, the heating unit 700 is arranged in order to locally and directly transfer heat to the material 100.

The shape of the heating unit 700 is preferably formed to correspond to the shape of the pressing surface 210 of the forming tool 200 getting in direct contact with the material 100 before forming. If the area of the heating unit 700 is larger than that of the pressing surface 210 of the forming tool 200, there may be difficulty in that the diaphragm 300 applies the material 100 onto the forming tool 200. If an area of the heating unit 700 is smaller than that of the pressing surface 210 of the forming tool 200, the effect of applying heat to the material 100 may be reduced.

On the other hand, as illustrated in the middle figure and the lower figure of FIG. 12, it is also possible that the volume-variable member 500 is arranged on the second part of the material disposed in such a way that the lower surface gets in contact with the heating unit 700.

Unlike the above, it is also possible to transfer heat to the material being formed by increasing the temperature of the entire space in which the material forming apparatus is located. For instance, the material forming apparatus may be placed in a chamber and the temperature of the chamber may be increased.

Additionally, unlike the heating unit 700 described above, a method of heating by electromagnetic waves, such as infrared rays, without contacting the material 100 may be adopted.

In addition, the heating unit 700 may be made of a soft and flexible material so as to be transformed by expansion of the diaphragm 300. When the heating unit 700 is used, the heating unit is formed to have a width greater than that of the pressing surface of the forming tool, and may be transformed by the diaphragm to pressurize the material from the lateral side. Therefore, the heating unit can directly heat the material part coated on the inner surface.

The foregoing description of the present disclosure has been presented for the purposes of illustration and description. It is apparent to a person having ordinary skill in the art to which the present disclosure relates that the present disclosure can be easily modified into other detailed forms without changing the technical principle or essential features of the present disclosure. Therefore, the foregoing embodiments should be regarded as illustrative rather than limiting in all aspects. In an example, each component which has been described as a unitary part can be implemented as distributed parts. Similarly, each component which has been described as distributed parts can also be implemented as a combined part.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A material forming apparatus configured to form an article by transforming a material having a sheet shape, the material forming apparatus comprising:
    a forming tool having a pressing surface for compressing a first part of the material, wherein the material has the first part covered by the forming tool and second parts deviating from the forming tool;
    a support positioned at a side of the forming tool to support the forming tool;
    a support frame placed apart from the support to allow the forming tool to be disposed between the support frame and the support, wherein the support frame includes at least one passage formed in the support frame such that a fluid is provided through the at least one passage;
    a diaphragm disposed on the support frame to form an airtight space between the diaphragm and the support frame to constitute a pressure cell, the diaphragm having an outer surface on which the material is located and having an inner surface on which fluid pressure for expansion of the diaphragm is provided by the fluid provided into the airtight space through the at least one passage of the support frame, wherein the outer surface of the diaphragm expanded by the fluid provided through the at least one passage presses the second parts of the material while getting in contact with the second parts in a state where the first part of the material is pressed in a direction perpendicular to the pressing surface by being compressed by the forming tool and the outer surface of the diaphragm;
    a volume-variable member disposed at at least one side of the forming tool between the diaphragm and the support so that at least a portion thereof is positioned on the second part of the material, wherein the second part of the material is compressed on the surface of the volume-variable member by the diaphragm, wherein the volume-variable member is configured to suppress wrinkling of the material and to allow the second part of the material to approach the forming tool according to continuous expansion of the diaphragm in a state in which the second part of the material is pressed in a direction perpendicular to the outer surface of the diaphragm by being compressed onto the surface of the volume-variable member by the diaphragm and the second part is compressed by the diaphragm and the volume-variable member; and
    a structure capable of selectively opening and shielding a space between the support and the diaphragm in a lateral direction of the material forming apparatus so as for an operator to insert a hand or a tool in order to adjust a position of the volume-variable member.

2. The material forming apparatus according to claim 1, wherein the volume-variable member is a balloon or an elongated tube capable of being selected according to a shape of the forming tool.

3. The material forming apparatus according to claim 1, wherein in a state where the second part of the material is compressed by the diaphragm and the volume-variable member, as the diaphragm continues to expand, the volume of the volume variable member is gradually decreased in a state where the volume-variable member is restricted by a surface of the forming tool and the support, and the volume-variable member is separated between the second part of the material and the forming tool at the time that forming is finished, so that the second part of the material is formed to conform the surface of the forming tool.

4. The material forming apparatus according to claim 1, wherein the material is a thermoformable material or a composite material using the thermoformable material as a matrix, and
    wherein the diaphragm is a transformable diaphragm.

5. The material forming apparatus according to claim 1, wherein the forming tool has a side surface connected to the pressing surface, the pressing surface and the side surface are one of a flat surface, a concave surface, and a convex surface so that the forming tool has a double curvature, and the volume-variable member is located at the side surface.

6. The material forming apparatus according to claim 1, further comprising:
    a heating unit disposed to approach the material to transfer heat to the material.

7. The material forming apparatus according to claim 1, further comprising:
    a clamp for clamping an edge of the diaphragm to form an airtight state for fluid pressure provided to the inner surface of the diaphragm.

8. A material forming apparatus configured to form an article by transforming a material having a sheet shape, the material forming apparatus comprising:
    a forming tool having a pressing surface for compressing a first part of the material, wherein the material has the first part covered by the forming tool and second parts deviating from the forming tool;
    a support positioned at a side of the forming tool to support the forming tool;
    a support frame placed apart from the support to allow the forming tool to be disposed between the support frame and the support, wherein the support frame includes at least one passage formed in the support frame such that a fluid is provided through the at least one passage;
a diaphragm disposed on the support frame to form an airtight space between the diaphragm and the support frame to constitute a pressure cell, the diaphragm having an outer surface on which the material is located and having an inner surface on which fluid pressure for expansion of the diaphragm is provided by the fluid provided into the airtight space through the at least one passage of the support frame, wherein the outer surface of the diaphragm expanded by the fluid provided through the at least one passage presses the second parts of the material while getting in contact with the second parts in a state where the first part of the material is pressed in a direction perpendicular to the pressing surface by being compressed by the forming tool and the outer surface of the diaphragm;
a volume-variable member disposed at at least one side of the forming tool between the diaphragm and the support so that at least a portion thereof is positioned on the second part of the material, wherein the second part of the material is compressed on a surface of the volume-variable member by the diaphragm, wherein of volume-variable member is configured to suppress wrinkling of the material and to allow the second part of the material to approach the forming tool according to continuous expansion of the diaphragm in a state in which the second part of the material is pressed in a direction perpendicular to the outer surface of the diaphragm by being compressed onto the surface of the volume-variable member by the diaphragm and the second part is compressed by the diaphragm and the volume-variable member; and
a heating unit disposed near the material to transfer heat to the material,
wherein the heating unit is located between the outer surface of the diaphragm and the first part of the material, and is transformable by the expansion of the diaphragm.

9. The material forming apparatus according to claim 8, wherein the heating unit is narrower than the first part of the material so as for the diaphragm not to interrupt forming of the second parts of the material.

10. A material forming method for forming an article by transforming a material having a sheet shape by using a material forming apparatus which includes a forming tool, a support positioned to support the forming tool, and a support frame placed apart from the support to allow the forming tool to be disposed between the support frame and the support, wherein the support frame includes at least one passage formed in the support frame such that a fluid is provided through the at least one passage, and a diaphragm disposed on the support frame to form an airtight space between the diaphragm and the support frame to constitute a pressure cell, the material forming method comprising:
arranging the material and the forming tool on an outer surface of the diaphragm so that the material has a first part covered by the forming tool and second parts deviating from the forming tool, wherein the forming tool has a pressing surface for compressing the first part of the material;
locating a volume-variable member disposed at at least one side of the forming tool between the diaphragm and the support, which faces the outer surface of the diaphragm and supports the forming tool;
expanding the diaphragm by fluid pressure applied to an inner surface of the diaphragm by providing the fluid into the airtight space through the at least one passage of the support frame and compressing the second parts of the material on the surface of the volume-variable member when the outer surface of the expanding diaphragm presses the second parts of the material in a state where the first part of the material is pressed in a direction perpendicular to the pressing surface by being compressed by the forming tool and the outer surface of the diaphragm; and
decreasing the volume of the volume-variable member according to continuous expansion of the diaphragm in a state in which the second part of the material is pressed in a direction perpendicular to the outer surface of the diaphragm by being compressed onto the surface of the volume-variable member by the diaphragm and the second part is compressed by the diaphragm and the volume-variable member, so as to suppress wrinkling of the material and transform the second part of the material,
wherein a structure capable of selectively opening and shielding a space between the support and the diaphragm is provided in a lateral direction of the material forming apparatus such that an operator can insert a hand or a tool in order to adjust a position of the volume-variable member.

11. The material forming method according to claim 10, wherein the step of arranging the material and the forming tool includes a step of arranging a heating unit for transferring heat to the material to approach the material.

12. The material forming method according to claim 10, wherein in the step of locating the volume-variable member in the vicinity of the forming tool, the volume-variable member is a balloon or an elongated tube capable of being selected according to a shape of the forming tool, and is located on a side of the forming tool.

13. The material forming method according to claim 10, wherein the step of locating the volume-variable member in the vicinity of the forming tool includes the steps of:
locating the volume-variable member in the vicinity of the forming tool so that at least a portion of the volume-variable member is located on the second part of the material; and
pressing the forming tool by the support to compress the first part of the material by the outer surface of the diaphragm and the forming tool.

14. The material forming method according to claim 10, wherein the forming tool includes a side surface connected to the pressing surface, and
wherein in the step of locating the volume-variable member in the vicinity of the forming tool, the volume-variable member is located on the side of the forming tool so that the volume-variable member can correspond to a position where the variable-volume member is predicted to be a wrinkle-prone region of the second part of the material.

15. The material forming method according to claim 10, wherein the transforming step includes a step of continuously expanding the diaphragm in a state where the second part of the material is compressed by the diaphragm and the volume-variable member, gradually decreasing the volume of the volume variable member in a state where the volume-variable member is constrained by the surface of the forming tool and the support according to the continuous expansion of the diaphragm, and separating the volume-variable member between the second part of the material and the forming tool at a time that forming is finished, so that the second part of the material is laminated on the surface of the forming tool.

16. The material forming method according to claim 15, after the step of laminating the second part of the material on the surface of the forming tool, further comprising a step of:

laminating additional material on the surface of the forming part at least once more, wherein the step of laminating the additional material includes the steps of:

separating the material coated on the forming tool from the outer surface of the diaphragm;

locating the additional material between the outer surface of the diaphragm and the material coated on the forming tool; and laminating the additional material on the previous material by performing the steps of locating a volume-variable member with respect to the additional material, compressing the additional material on the volume-variable member, and transforming the second part of the material in sequential order.

17. The material forming method according to claim 16, further comprising the steps of:

hardening a plurality of materials formed on the forming tool by repeating the steps of laminating the additional material so as to form a plurality of hardened layers of the materials; and separating the plurality of materials with the plurality of hardened layers from the forming tool.

18. The material forming method according to claim 10, further comprising at least one of the steps of:

stopping the expansion of the diaphragm, and adjusting the position of the volume-variable member between the second part of the material and the forming tool by the operator's hand or with a tool;

detaching the volume-variable member, and mounting it between the second part of the material and the forming tool again; and replacing the volume-variable member.

* * * * *